United States Patent Office 3,454,796
Patented July 8, 1969

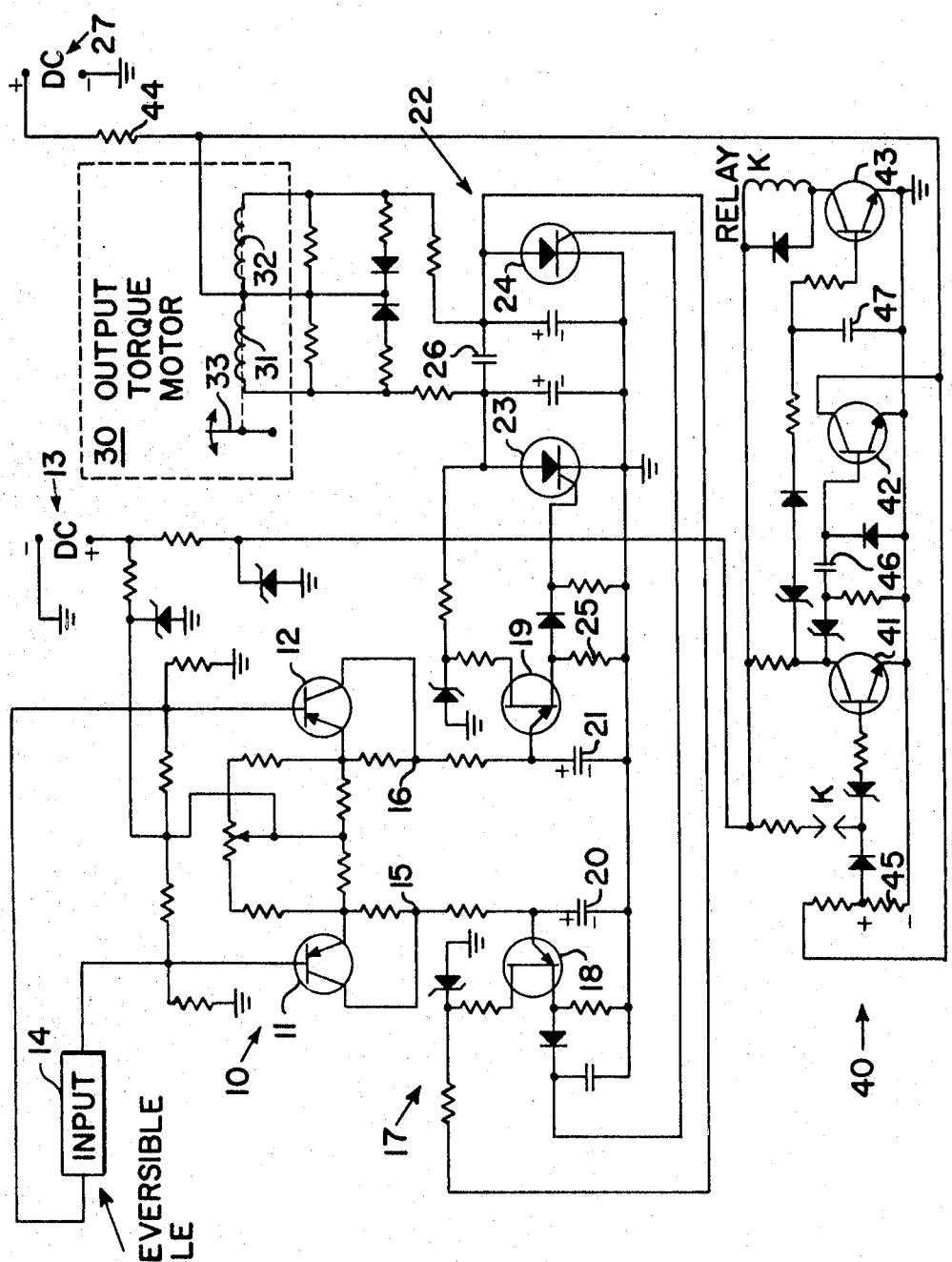

3,454,796
CONTROL APPARATUS
Lawrence K. Bell, Minneapolis, Minn., assignor to Honeywell Inc., Minneapolis, Minn., a corporation of Delaware
Filed Nov. 5, 1965, Ser. No. 506,528
Int. Cl. H03k *19/08*
U.S. Cl. 307—305                                                 8 Claims

ABSTRACT OF THE DISCLOSURE

A pair of SCR's are connected to receive anode-cathode operating voltage from a source of DC voltage whose magnitude does not drop below the extinction potential of the rectifiers, a commutating means is provided to turn off one of the rectifiers when the other is rendered conductive, a pair of unijunction transistors are connected to control the time of firing of the rectifiers and the base electrodes of each unijunction transistor are connected across the rectifier which it controls, a differential amplifier differentially controls the time of firing of the unijunction transistors, a load is connected in circuit with the rectifiers to be energized by pulse-width-modulated power, and a fail-safe commutation structure responds to the simultaneous firing of both of the rectifiers to interrupt the voltage across the rectifiers and restore the rectifiers to a nonconducting condition in the event that the commutating means fails to operate.

---

Referring to the single figure, reference numeral 10 designates a differential amplifier having a pair of transistors 11 and 12 which receive operating voltage from a first source of DC voltage 13. Amplifier 10 is controlled from an input signal source 14. This input signal source is a DC input voltage of the reversible polarity and variable magnitude.

The output of differential amplifier 10 exists at terminals 15 and 16 and these terminals are connected to the input of unijunction transistor firing network 17, this network including unijunction transistors 18 and 19. The time of firing of unijunction transistors 18 and 19 is controlled by capacitors 20 and 21, respectively, these capacitors being charged from terminals 15 and 16 respectively. The operation of differential amplifier 10 is such that if the charging rate of capacitor 20 is increased, then, at the same time the charging rate of capacitor 21 is differentially decreased and the capacitor is charged at a slower rate.

Reference numeral 22 designates a control rectifier network having a pair of SCR's 23 and 24 which are connected to receive their anode-cathode operating voltage from a second source of DC voltage 25. The anode and cathode electrodes of each of the control rectifiers are connected to the base electrodes of one of the unijunction transistors, and this one unijunction transistor to which the control rectifier is connected has its output circuit connected to control the gate electrode of that control rectifier. For example, the anode and cathode electrodes of SCR 23 are connected to the base electrodes of unijunction transistor 19 and the output of this unijunction transistor, that is resistor 25, is connected to the gate and cathode electrodes of SCR 23.

The anode electrodes of the SCR's are joined by a commutating capacitor 26 which functions to commutate the conducting SCR to a nonconducting condition when the other SCR fires.

Reference numeral 30 designates the output means of the structure disclosed in the single figure and this output means has been designated as an output torque motor having a pair of windings 31 and 32, the relative energization of which controls the position of an armature 33. When windings 31 and 32 are equally energized, then armature 33 assumes a midposition, as shown. When one of the windings is energized to a greater extent than is the other winding, armature 33 moves off its center position, in one way or the other, as determined by the polarity of input 14. The amount of this movement is determined by the magnitude of input 14.

With the structure thus defined, I pulse width modulate the power applied to output structure 30. With no input signal, or a minimum signal, present from input 14, differential amplifier 10 controls the time of firing of unijunction transistors 18 and 19 such that SCR's 23 and 24 are conductive for equal periods of time. As a result, current flows through windings 31 and 32 for equal periods of time but not simultaneously, which provides a "dither" of the armature. If it is assumed that an input signal increases, this signal causes one of the transistors 11 and 12 to conduct more current as the other transistor conducts less current. As a result, one of the unijunction transistors 18 and 19 fires before the other unijunction and SCR's 23 and 24 are conductive for unequal periods of time. Thus, unequal currents flow through windings 31 and 32. It will be noted that the firing of a particular SCR is effective to remove the base voltage from only that unijunction which controls that SCR. The other unijunction is effective to fire at a later time as its control capacitor charges as the result of operation of differential amplifier 10. The pulses of current applied to windings 31 and 32 also provide a desirable dither effect. The pulse repetition rate is set at several hundred cycles per second, for example 700 c.p.s.

In order to assure safe and reliable operation of the apparatus above described, I provide a fail-safe commutation network identified generally by means of reference numeral 40. This network includes a first transistor 41 which is normally conductive and second and third transistors 42 and 43 which are normally nonconductive. The operating voltage for the transistors 41, 42 and 43 is derived from DC source 13 whereas the input signal voltage for transistor 41 is derived from source 25 and is a function of the amount of current drawn by SCR's 23 and 24. A resistor 44 is provided in series with the SCR's and DC source 25. In the event both SCR's simultaneously conduct, then the voltage present across a resistor 45 drops to a value such as to render transistor 41 nonconductive. Nonconduction of transistor 41 causes transistor 42 to become conductive for as long a time period as capacitor 46 continues to charge from source 13. Thus, capacitor 46 and its associated circuitry can be considered to be a timer which retains transistor switch 42 closed for a time period. Transistor 42 is connected to momentarily remove the DC voltage from the rectifiers by means of a shunting of the rectifiers. In this way, the rectifiers are restored to a nonconducting condition.

Also, nonconduction of transistor 41 is effective to render transistor 43 conductive, and also to charge a capacitor 47. Capacitor 47, when charged, functions upon subsequent conduction of transistor 41 to maintain transistor 43 conductive during the discharge time of capacitor 47. Thus, capacitor 47 and its associated circuitry can be considered as a second timer which functions to maintain relay K energized during the discharge time of this capacitor. Relay K is provided with a single normally open switch connected in the base-to-emitter circuit of transistor 41 to apply a turn-on bias to transistor 41 from DC source 13 upon energization of relay K.

Assume for the moment that commutation has failed and that control rectifiers 23 and 24 simultaneously conduct. A relatively large voltage drop now appears across resistor 44 and a consequent reduction in voltage across resistor 45 is effective to render transistor 41 nonconductive. Transistors 42 and 43 are rendered conductive, transistor 42 remaining conductive during the charge time of capacitor 46 and transistor 43 delaying its turn on time according to the charge time of capacitor 47. With transistor 42 conductive, the DC voltage to the rectifiers 23 and 25 is momentarily interrupted and these rectifiers should restore to a nonconductive condition.

Furthermore, conduction of transistor 43 is effective to energize relay K and, by means of this relay's normally open switch, a turn-on bias is applied to transistor 41. When transistor 41 is again rendered conductive, transistor 43 remains conductive only during the discharge time of capacitor 47, and transistor 42 is rendered nonconductive, in the event that transistor 42 has not already been rendered nonconductive by means of the timing network including capacitor 46. During this period when transistor 43 is still conductive, capacitor 46 is allowed to discharge.

Normally, the above described operation will commutate SCR's 23 and 24 to a state of nonconduction. If this has not occurred or if the fault is still present, then the above cycle of operation will repeat, and will continue to repeat, until such time as the SCR's are commutated to a state of nonconduction. When commutation has been achieved, differential amplifier 10 and unijunction firing circuit 17 are again effective to control power applied to output 30. It will be noted that during the operation of fail-safe commutating network 40 output load 30 has assumed its neutral position.

While I have disclosed the output as being a torque motor, this output can be an electrical actuator having means responsive to a differential in time of conduction of the control rectifiers 23 and 24.

I claim as my invention:

1. Control apparatus wherein a pair of control rectifiers are connected to be energized by a DC voltage whose magnitude does not drop below the extinction voltage of the rectifiers, wherein the rectifiers are selectively fired one at a time, and wherein means are provided to commutate a conducting rectifier to a nonconducting state upon the firing of the other rectifier, the improvement comprising:
   a first and a second controllable switch means each having a first and a second state of operation, each having an output, and each having an input,
   means including the input of each of said first and second switch means connected to be controlled by the current flow due to conduction of the rectifiers to maintain said first and second switch means in said first state so long as both of the rectifiers do not conduct simultaneously,
   means connecting the output of said first switch means to momentarily interrupt simultaneous conduction of the rectifiers upon said first switch means assuming said second state,
   and further means connecting the output of said second switch means to said means including the input of said each of said first and second switch means to tend to return said first switch means to said first state upon second switch means assuming said second state.

2. The apparatus as defined in claim 1 wherein said means including the input of each of said first and second switch means includes a further controllable switch means having a first and a second state of operation, an output, and an input; wherein the input of said further switch means is connected to be controlled by the current flow due to conduction of the rectifiers to maintain said further switch means in said second state so long as both of said rectifiers do not conduct simultaneously; wherein the output of said further switch means is connected to the inputs of said first and second switch means to maintain said first and second switch means in said first state so long as said further switch means is in said second state; and wherein the output of said second switch means is connected to the input of said further switch means to tend to return said further switch means to said second state upon said second switch means assuming said second state.

3. The apparatus as defined in claim 2 wherein a first timing means is connected in circuit with the input of said first switch means to cause said first switch means to only momentarily assume said second state upon simultaneous conduction of the rectifiers.

4. The apparatus as defined in claim 3 wherein a second timing means is connected in circuit with the input of said second switch means to maintain said second switch means in said second state for a period of time after said further switch means assumes said second state.

5. The apparatus as defined in claim 1 wherein the selective firing of the rectifiers is achieved by a pair of unijunction transistors connected one to each of the rectifiers, to control the rectifier and to receive base operating voltage from the voltage across the rectifier, and wherein a differential amplifier is connected to each of the unijunction transistors to differentially control the time of firing of each of the unijunction transistors.

6. The apparatus as defined in claim 1 wherein said first and second controllable switch means are transistors, wherein said first state is a state of nonconduction and said second state is a state of conduction, and wherein the output of said first transistor is connected to momentarily short the rectifiers.

7. The apparatus as defined in claim 2 when said first, second, and further controllable switch means are transistors wherein said first state is a state of nonconduction and said second state is a state of conduction, wherein the input of said further transistor is controlled by the high current flow due to simultaneous conduction of both rectifiers so as to render said further transistor nonconductive and to render said first and second transistors conductive, wherein the output of said first transistor is connected to momentarily short the rectifiers when said first transistor is conductive, and wherein the output of said second transistor is connected to apply a turn-on bias to the input of said further transistor when said second transistor is conductive.

8. The apparatus as defined in claim 6 wherein the selective firing of the rectifiers is achieved by a pair of unijunction transistors connected one to each of the rectifiers, to control the rectifier and to receive base operating voltage from the voltage across the rectifier, and wherein a differential amplifier is connected to each of the unijunction transistors to differentially control the unijunction transistors.

References Cited

UNITED STATES PATENTS

| 2,059,562 | 11/1936 | Curtis et al. | 178—88 |
| 3,113,293 | 12/1963 | Breese et al. | 340—50 |
| 3,289,077 | 11/1966 | Miller | 324—70 |

ARTHUR GAUSS, Primary Examiner.

R. G. WOODBRIDGE, Assistant Examiner.

U.S. Cl. X.R.

307—252, 284; 328—72